United States Patent
Russell et al.

(10) Patent No.: US 10,433,349 B2
(45) Date of Patent: Oct. 1, 2019

(54) EXCHANGING POSITION AND SESSION DATA RESPONSIVE TO TRIGGER EVENTS

(71) Applicant: Motorola Mobility LLC, Chicago, IL (US)

(72) Inventors: Michael Russell, Lake Zurich, IL (US); Amitkumar Balar, Mundelein, IL (US)

(73) Assignee: Motorola Mobility LLC, Chicago, IL (US)

( * ) Notice: Subject to any disclaimer, the term of this patent is extended or adjusted under 35 U.S.C. 154(b) by 11 days.

(21) Appl. No.: 15/877,816

(22) Filed: Jan. 23, 2018

(65) Prior Publication Data
US 2019/0230719 A1    Jul. 25, 2019

(51) Int. Cl.
| | |
|---|---|
| H04L 5/14 | (2006.01) |
| H04W 76/10 | (2018.01) |
| H04W 4/02 | (2018.01) |

(52) U.S. Cl.
CPC ............. *H04W 76/10* (2018.02); *H04W 4/02* (2013.01)

(58) Field of Classification Search
None
See application file for complete search history.

(56) References Cited

U.S. PATENT DOCUMENTS

| | | | |
|---|---|---|---|
| 8,396,002 B2 * | 3/2013 | Marshall-Wilson | H04L 45/00 370/252 |
| 9,560,426 B1 * | 1/2017 | Daniel | H04L 67/125 |
| 2010/0158231 A1 * | 6/2010 | Newberg | H04W 4/08 379/202.01 |
| 2011/0179272 A1 * | 7/2011 | Klos | H04L 12/1818 713/168 |
| 2014/0040780 A1 * | 2/2014 | Artzt | H04L 65/403 715/753 |
| 2014/0095607 A1 * | 4/2014 | Fraccaroli | H04W 4/21 709/204 |
| 2014/0324649 A1 * | 10/2014 | Marshall | G06Q 10/1091 705/32 |
| 2015/0057042 A1 * | 2/2015 | Lection | H04W 40/023 455/519 |
| 2015/0263966 A1 * | 9/2015 | Blake | H04L 47/28 370/229 |
| 2016/0234703 A1 * | 8/2016 | Aldana | H04L 43/0864 |
| 2016/0302034 A1 * | 10/2016 | Sophinos | H04W 4/021 |
| 2019/0101884 A1 * | 4/2019 | Miller | G05B 19/054 |
| 2019/0124466 A1 * | 4/2019 | Masterson | H04W 4/021 |

OTHER PUBLICATIONS

Bluetooth Specification, Proximity Profile, Jul. 14, 2015.
Nokia Research Center, High Accuracy Indoor Positioning Based on BLE, Kimmo Kalliola, Research Leader, Apr. 27, 2011.

\* cited by examiner

*Primary Examiner* — Kwang B Yao
*Assistant Examiner* — Juvena W Loo
(74) *Attorney, Agent, or Firm* — Amerson Law Firm, PLLC

(57) ABSTRACT

A method includes, responsive to a trigger event, establishing a session between a first device and a set of second devices. Session data is exchanged with the second devices in the session. The session data includes identity data and position data. A relative position of each of the second devices in the session relative to the first device is determined based on the position data. Event data and data including the relative position associated with the session are logged. A selected one of the set of second devices is removed from the session responsive to a termination event and the exchanging of the session data with the selected one of the second devices is terminated.

20 Claims, 3 Drawing Sheets

EXCHANGING POSITION AND SESSION DATA RESPONSIVE TO TRIGGER EVENTS

BACKGROUND

Field of the Disclosure

The disclosed subject matter relates generally to mobile computing systems and, more particularly, to exchanging position and session data responsive to trigger events.

Description of the Related Art

Mobile devices provide powerful platforms for communication, data exchange and collaboration. The user experience for mobile devices has evolved such that the mobile device acts as an assistant rather than just a communication tool. To support an assistant paradigm, the mobile device needs to generate relevant context data regarding the user's environment, such as the location and identity of other devices in the vicinity of the user. Some of the devices may be associated with individuals that collaborate with the user (e.g., in a meeting, conference, social circle, etc.), while other devices may be associated with other users that just happen to be in the vicinity. To provide autonomous assistant services, the mobile device needs to be able to distinguish between the two groups.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art, by referencing the accompanying drawings.

The use of the same reference symbols in different drawings indicates similar or identical items.

DETAILED DESCRIPTION OF EMBODIMENT(S)

Figure 1:
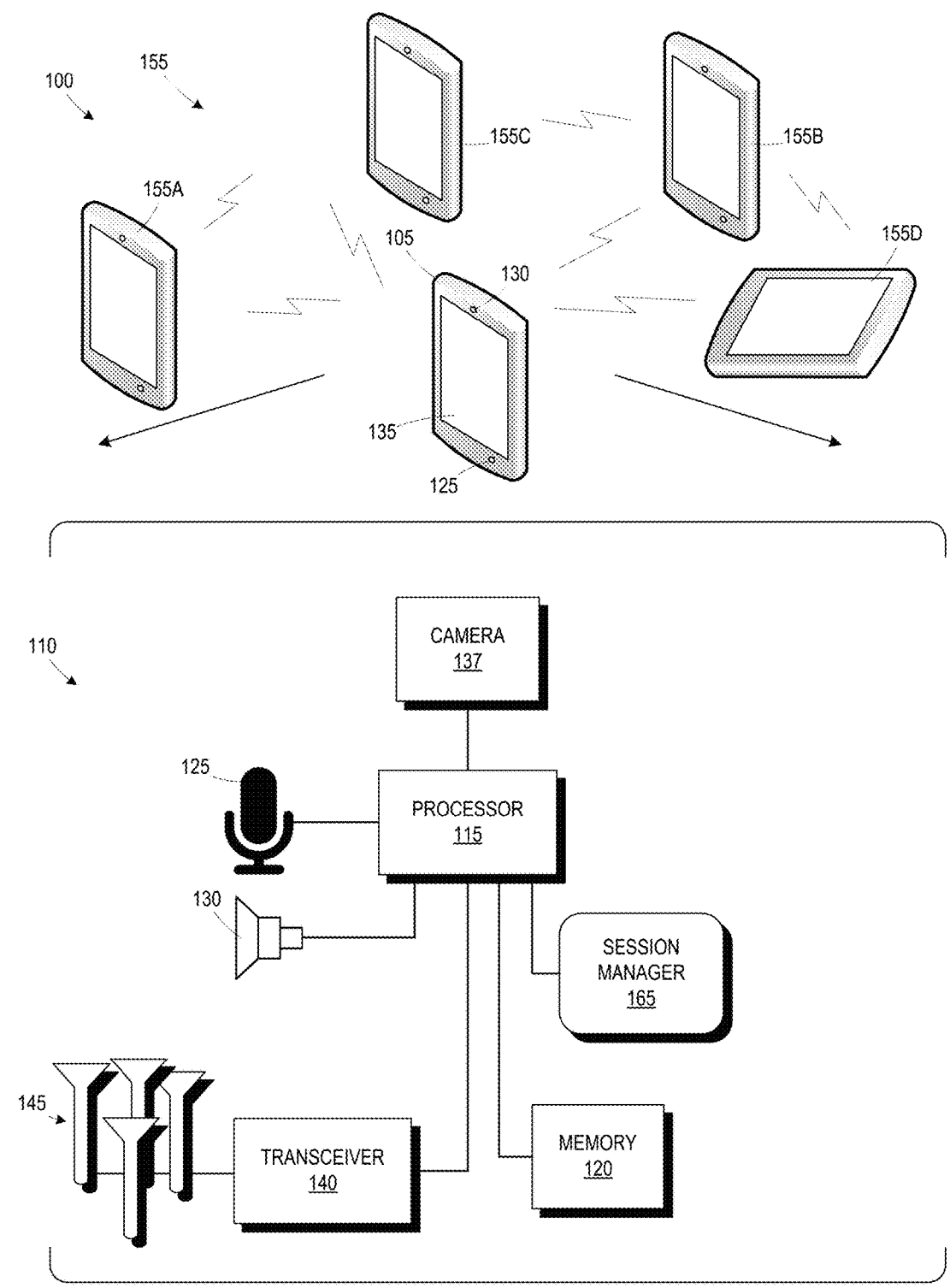
FIG. 1 is a simplified block diagram of a communication system including multiple devices, wherein at least one of the mobile devices is configured to exchange position and session data with a selected set of the mobile devices responsive to trigger events, in accordance with some embodiments.
Figure 2:
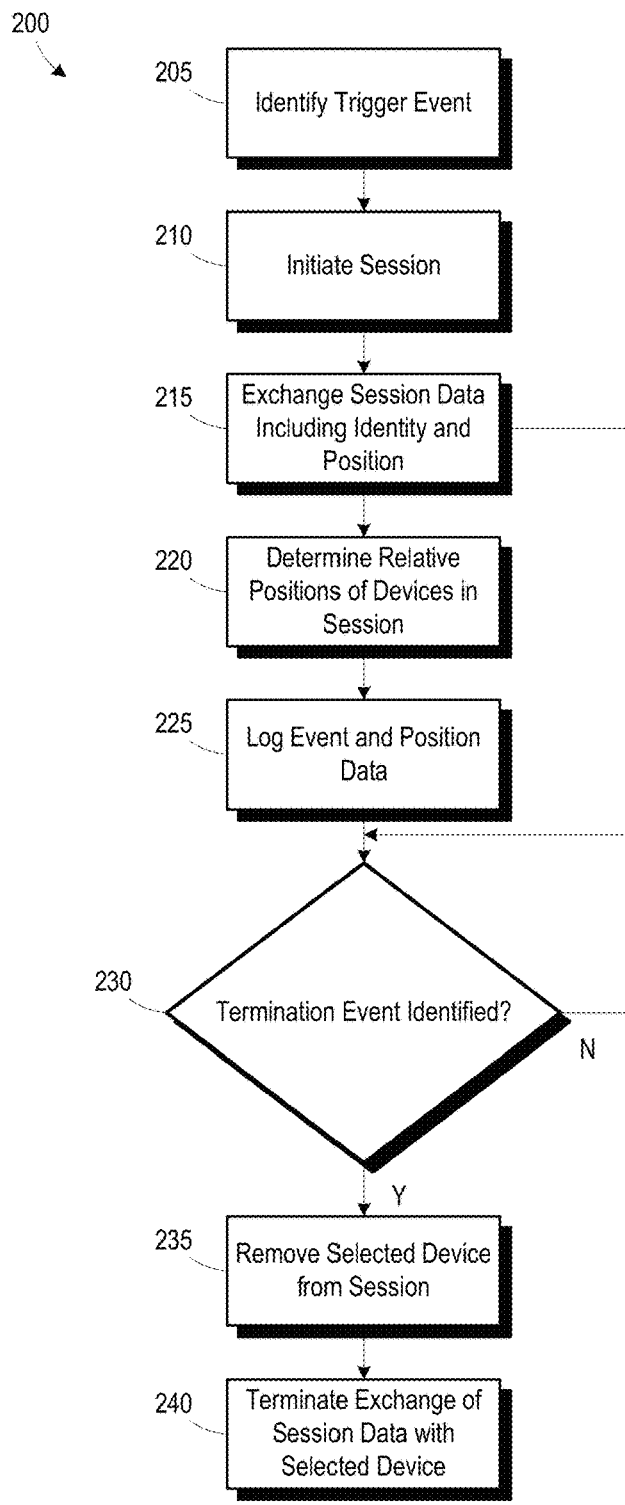
FIG. 2 is a flow diagram of a method for exchanging position and session data responsive to trigger events, in accordance with some embodiments.
Figure 3:
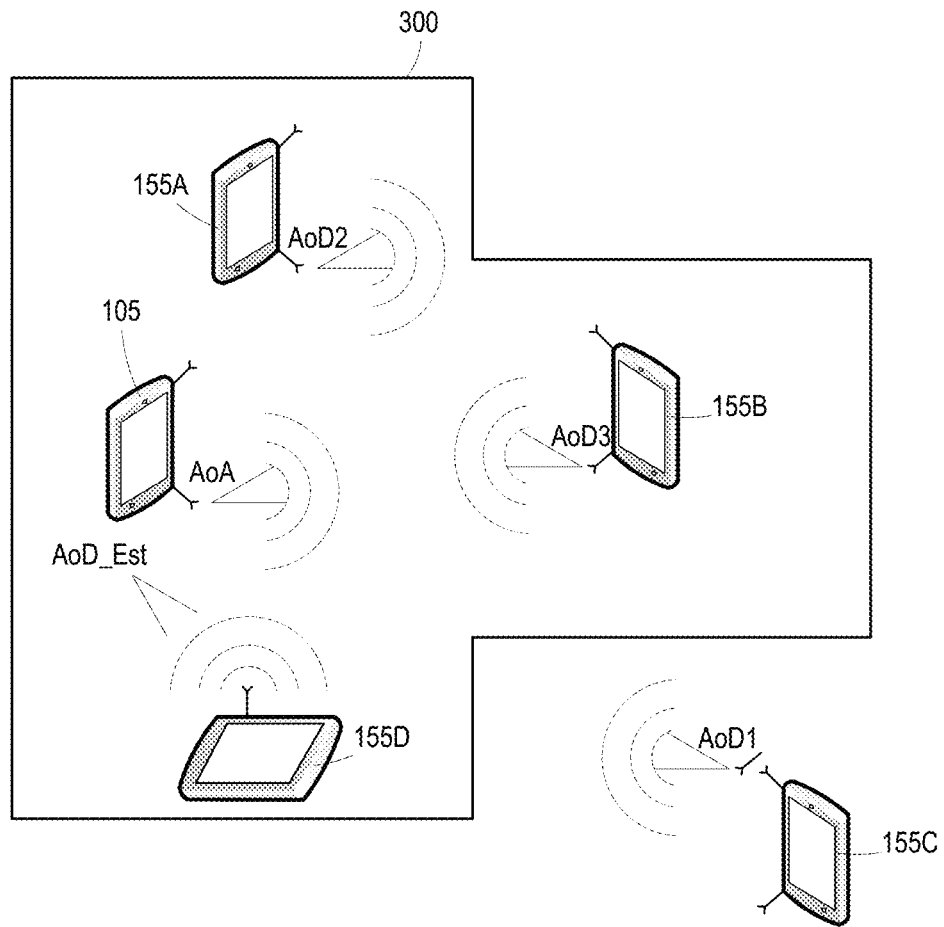
FIG. 3 is a diagram illustrating multiple other devices proximate the device exchanging position data, in accordance with some embodiments.

FIGS. 1-3 illustrate example techniques for exchanging position and session data responsive to trigger events, according to some embodiments. In one example, a session may be initiated between mobile devices responsive to a trigger event, such as an invitation, calendar event, entry into a predefined space, etc. Session data including identity and position data may be exchanged, and a particular mobile device may log the session data and other context data associated with the session. One or more of the devices in the session may be removed responsive to a termination event.

FIG. 1 is a simplistic block diagram of a communications system 100 including a device 105. The device 105 implements a computing system 110 including, among other things, a processor 115, a memory 120, a microphone 125, a speaker 130, a display 135 and a camera 137. The memory 120 may be a volatile memory (e.g., DRAM, SRAM) or a non-volatile memory (e.g., ROM, flash memory, etc.), or a combination thereof. The device 105 includes a transceiver 140 for transmitting and receiving signals via an array of antennas 145 (e.g., multiple input multiple output (MIMO) antenna array) over one or more communication links. The transceiver 140 may include one or more radios for communicating according to different radio access technologies, such as cellular, Wi-Fi, Bluetooth®, ZigBee, etc. The communication links may have a variety of forms. In some embodiments, the communication links may be wireless radio or cellular radio links. The transceiver 140 may also communicate over a packet-based communication network, such as the Internet.

As illustrated in FIG. 1, the device 105 may be positioned near a set of devices 155 (e.g., one or more other devices 155A-D). The other devices 155 may also include a computing system having some or all of the entities in the computing system 110 of the device 105, such as a processor, a memory and a transceiver. In various embodiments, the devices 155 may be embodied in handheld or wearable devices, such as laptop computers, handheld computers, tablet computers, mobile devices, telephones, personal data assistants, music players, game devices, wearable computing devices, and the like.

In the device 105, the processor 115 may execute instructions stored in the memory 120 and store information in the memory 120, such as the results of the executed instructions. Some embodiments of the processor 115, the memory 120 and the microphone 125 may be configured to implement a session manager 165 and perform portions of a method 200 shown in FIG. 2 and discussed below. For example, the processor 115 may execute the session manager 165 to initiate a session between mobile devices responsive to a trigger event (e.g., invitation, calendar event, entry into a predefined space, etc.), exchange session data including identity and position data, log the session data and other context data associated with the session, and remove one or more of the devices from the session responsive to a termination event.

FIG. 2 is a flow diagram of one illustrative method for exchanging position and session data responsive to trigger events, in accordance with some embodiments. In method block 205, the session manager 165 identifies a trigger event. Various trigger events may be employed. For example, in some embodiments, the session manager 165 may identify a calendar event stored in the device 105 indicating a meeting and a list of participants. In another embodiment, the session manager 165 may send out an invitation (e.g., similar to a pairing request) that other devices 155 proximate the device 105 may receive. The invitation may be associated with remote service, where users log in to the remote service and opt in to a particular event. In yet another embodiment, the session manager 165 may identify the proximity of a device 155 that has been designated as being within a predetermined social circle of a user of the device 105.

In method block 210, the session manager 165 initiates a session responsive to the trigger event. At this point, the session may be tentative, as the session manager 165 may not yet have verified identities. All devices 155 proximate the device 105 may initially be tentatively allowed to enter the session.

In method block 215, the session manager 165 exchanges session data with the other devices 155. In some embodiments, the session data includes identity data and position data. The identity data allows the session manager 165 to validate the participants. The identity data may include hardware identification codes, user identity information, etc. The session data may also include capability data, such as the type of AI assistant used on the device 155, the cloud services connected to the device 155 to enable back-end cloud based interactions and exchange of capabilities (i.e., to facilitate the scheduling of a follow-up meeting between two or more session participants once the identity is known and that they share particular cloud services capability). Machine learning models or training data may be shared for collaborative AI processing—based on identity (e.g., family). To facilitate the capability data exchange, the identity data may include device manufacturer information (e.g., tablet, phone, watch, or laptop hardware and firmware identifiers). The identity information may also include a specific resolving key that may be distributed with the invitation and used to authenticate the participants and encrypt session data. If a non-authorized participant is identified (e.g., not invited to the meeting, not on the invitation, not in the social circle, no valid key, etc.), they may be terminated immediately or the session manager 165 may display a prompt on the display 135 allowing the user to authorize the participant. In the context of FIG. 2, the session manager 165 may treat the identification of a non-authorized participant as a termination event in method block 230 and remove the selected device in method block 235.

In method block 220, the session manager 165 determines the relative positions of the devices 155 to the device 105. In some embodiments, the position data exchanged may be angle of departure (AoD) information, where each device 155 with MIMO capability transmits its angle of departure. FIG. 3 is a diagram illustrating multiple devices 155 proximate the device 105 exchanging position data, in accordance with some embodiments. Devices 155A, 155B and 155C have MIMO capability. The devices 155A, 155B and 155C transmit their AoD data in the session data, which is received by the session manger 165. However, the device 155D does not have MIMO capability (e.g., single antenna), so it cannot directly send its AoD data. It is possible for the session manager 165 to estimate the AoD for the device 155D using a switching technique. I/Q samples can be transmitted by the device 155D using a predetermined arrangement of time slots. The session manager 165 can then use the signal received by the device 105 to estimate the AoD data for the device 155D. In this case, the position data is the I/Q data sent in predetermined time slots that allows the session manger 165 to estimate the AoD for the device 155D.

In method block 220, the session manager 165 determines the relative position of each of the devices 155. The session manger 165 calculates the angle of arrival (AoA) for each of the devices 155 using the transmitted or estimated AoD data. A signal power measurement may be used to estimate the range of each of the devices. Techniques for estimating the AoD, calculating the AoA, and calculating the range are known to those of ordinary skill in the art, and they are defined in industry standards, such as BLUETOOTH® Low Energy (LE), WiFi fine time measurements, etc. Hence, they are not described in detail herein to avoid obscuring the present subject matter. The exchange of positon data and the determination of the relative positions in method blocks 215, 220 may be done continuously or at predetermined intervals.

In some embodiments, a physical boundary is determined for the session, such as the walls of a conference room, tradeshow booth, boundaries of a home, trusted zones, etc. Such a boundary 300 is illustrated in FIG. 3. Note that the device 155C is outside the boundary 300. In some cases, the device 155C may have initially been inside the boundary 300, but may have left the room, thus going outside the boundary 300. In the context of FIG. 2, the session manager 165 may treat the positon of the device 155D outside the boundary 300 as a termination event in method block 230 and remove the selected device in method block 235.

In method block 225, the session manager 165 generates event data and logs the event data with the determined relative positions. If a specific resolving key was employed, the event data may be encrypted. In some embodiments, an encryption key may be exchanged during the initiation of the session after some other form of identity authentication. The scope of the session manger 165 may vary. In some embodiments, the session manger 165 and device 105 may be associated with a small environment, such as a room, a vehicle, a trade show booth, etc. Larger environments may include a portion of a building, a home, etc.

There are many example of event data that may be generated and logged. For example, a meeting may be transcribed. The session manager 165 may correlate specific speech to specific users using the signal from the microphone 125 and the known positions of the devices 155. The actions being taken by the associated device 155 (or by the assistant on the device 155) may be exchanged to allow for collaboration. In a vehicle environment, the session manager 165 may log the driver of the vehicle and respond differently to voice commands depending on which device 105, 155 is associated with the driver. The positon data may also be used to unlock and lock objects or other devices. For example, if an authorized user is detected near a door lock based on the position data, the door may be unlocked and the passage of the user of the associated device 155 through the door may be logged in the session data. The position of the device 155 in front of or proximate another device, such as laptop computer, television, speaker, etc., may be employed by the session manager 165 to unlock the device. The absence of the device 155 may allow the session manger 165 to lock the device, reduce the backlight, reduce the time-out interval, etc. In some embodiments, the event data may include image data captured by the camera 137 (see FIG. 1) responsive to certain events (e.g., access control events).

In method block 230, the session manger 165 identifies a termination event. Termination events include the positioning of the device 155 outside the boundary 300, the expiration of a predetermined time interval established when the session was initiated, an identity authentication failure, a request from the device 105 or one of the other devices 155 to remove a selected device 155, the completion of the event, etc.

Responsive to identifying the termination event in method block 230, the session manager 165 removes one or more selected devices 155 from the session in method block 235 and terminates the exchange of session data with the selected device 155 in method block 240. Termination events may affect selected devices 155 or all of the devices 155.

Initiating sessions and logging event data and positon data allows context-based actions to be taken by the session manger 165 or allows the session manager 165 to make recommendations to the user of the device 105.

In some embodiments, certain aspects of the techniques described above may be implemented by one or more processors of a processing system executing software. The method 200 described herein may be implemented by executing software on a computing device, such as the processor 115 of FIG. 1, however, such methods are not abstract in that they improve the operation of the devices 105, 155 and the user's experience when operating the devices 105, 155. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes, responsive to a trigger event, establishing a session between a first device and a set of second devices. Session data is exchanged with the second devices in the session. The session data includes identity data and position data. A relative position of each of the second devices in the session relative to the first device is determined based on the position data. Event data and data including the relative position associated with the session are logged. A selected one of the set of second devices is removed from the session responsive to a termination event and the exchanging of the session data with the selected one of the second devices is terminated.

A device includes a transceiver, a multiple input multiple output (MIMO) antenna coupled to the transceiver, and a processor coupled to the transceiver. The processor is to, responsive to a trigger event, establish a session between a first device and a set of second devices, exchange session data with the second devices in the session using the MIMO antenna, wherein the session data includes identity data and position data, determine a relative position of each of the second devices in the session relative to the first device based on the position data, log event data and data including the relative position associated with the session, and remove a selected one of the set of second devices from the session responsive to a termination event, and terminate the exchanging of the session data with the selected one of the second devices.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
    responsive to a trigger event, establishing a session between a first device and a set of second devices;
    exchanging session data with the second devices in the session, wherein the session data comprises identity data and position data;
    determining a relative position of each of the second devices in the session relative to the first device based on the position data;
    logging event data and data including the relative position associated with the session;
    activating a third device associated with the session for a selected one of the second devices based on the relative position of the selected one of the second devices; and
    removing a selected one of the set of second devices from the session responsive to a termination event and terminating the exchanging of the session data with the selected one of the second devices.

2. The method of claim 1, wherein the position data comprises angle of departure data.

3. The method of claim 1, wherein determining the relative position comprises determining a range of each of the second devices.

4. The method of claim 1, wherein the termination event comprises an elapsing of a predetermined time interval.

5. The method of claim 1, wherein the termination event comprises a termination request initiated by one of the first or second devices.

6. The method of claim 1, wherein the trigger event comprises a calendar event.

7. The method of claim 1, wherein the trigger event comprises a session request.

8. The method of claim 1, wherein the termination event comprises a determination that identity data for the selected one of the second devices does not match a predetermined list of session participants.

9. The method of claim 1, further comprising determining a position boundary associated with the session, wherein the triggering event comprises a determination that the set of second devices are inside the position boundary.

10. The method of claim 1, further comprising determining a position boundary associated with the session, wherein the termination event comprises a determination that the position of the selected one of the plurality of second devices is outside the position boundary.

11. A device, comprising:
a transceiver;
a multiple input multiple output (MIMO) antenna coupled to the transceiver; and
a processor coupled to the transceiver, wherein the processor is to, responsive to a trigger event, establish a session between a first device and a set of second devices, exchange session data with the second devices in the session using the MIMO antenna, wherein the session data includes identity data and position data, determine a relative position of each of the second devices in the session relative to the first device based on the position data, log event data and data including the relative position associated with the session, activate a third device associated with the session for a selected one of the second devices based on the relative position of the selected one of the second devices, and remove a selected one of the set of second devices from the session responsive to a termination event, and terminate the exchanging of the session data with the selected one of the second devices.

12. The device of claim 11, wherein the position data comprises angle of departure data.

13. The device of claim 11, wherein the processor is to determine the position by determining a range of each of the second devices.

14. The device of claim 11, wherein the termination event comprises an elapsing of a predetermined time interval.

15. The device of claim 11, wherein the termination event comprises a termination request initiated by one of the first or second devices.

16. The device of claim 11, wherein the trigger event comprises a calendar event.

17. The device of claim 11, wherein the trigger event comprises a session request.

18. The device of claim 11, wherein the termination event comprises a determination that identity data for the selected one of the second devices does not match a predetermined list of session participants.

19. The device of claim 11, wherein the processor is to determine a position boundary associated with the session, and the triggering event comprises a determination that the set of second devices are each inside the position boundary.

20. The device of claim 11, wherein the processor is to determine a position boundary associated with the session, and the termination event comprises a determination that the position of the selected one of the plurality of second devices is outside the position boundary.

* * * * *